(12) United States Patent
Healy et al.

(10) Patent No.: US 9,766,479 B2
(45) Date of Patent: Sep. 19, 2017

(54) EYEGLASSES FOR PERSONAL AND COMMERCIAL USE INCLUDING REUSE IN 3D THEATER AND OTHER REPEATED OPERATIONS

(75) Inventors: Andrew Healy, San Francisco, CA (US); Thao D. Hovanky, San Francisco, CA (US); Julian Farnam, Livemore, CA (US); Brad Basler, San Mateo, CA (US); Pascal Sijen, La Quinta, CA (US); Alan O'Brien, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 922 days.

(21) Appl. No.: 13/398,437

(22) Filed: Feb. 16, 2012

(65) Prior Publication Data

US 2012/0224260 A1    Sep. 6, 2012

Related U.S. Application Data

(60) Provisional application No. 61/449,635, filed on Mar. 5, 2011.

(51) Int. Cl.
| | |
|---|---|
| *G02C 7/16* | (2006.01) |
| *G02C 5/10* | (2006.01) |
| *G02B 27/01* | (2006.01) |
| *G02C 1/06* | (2006.01) |
| *G02C 5/00* | (2006.01) |
| *G02C 5/22* | (2006.01) |
| *G02C 11/00* | (2006.01) |
| *G02B 5/20* | (2006.01) |

(52) U.S. Cl.
CPC ............ *G02C 5/10* (2013.01); *G02B 27/0172* (2013.01); *G02B 27/0176* (2013.01); *G02C 1/06* (2013.01); *G02C 5/008* (2013.01); *G02C 5/2272* (2013.01); *G02C 7/16* (2013.01); *G02C 11/10* (2013.01); *G02B 5/20* (2013.01); *G02B 2027/0134* (2013.01); *G02B 2027/0178* (2013.01)

(58) Field of Classification Search
CPC ....................................................... G02C 7/16
USPC ...... 359/464; 351/43, 151, 158, 86, 106, 78, 351/79, 87, 131, 132, 136, 41, 45, 46, 62; 348/42
See application file for complete search history.

(56) References Cited

U.S. PATENT DOCUMENTS

| | | | | |
|---|---|---|---|---|
| 3,060,804 | A | * | 10/1962 | Rogers |
| 3,691,565 | A | * | 9/1972 | Galonek .............................. 2/14 |
| 4,056,853 | A | * | 11/1977 | Bottazzini et al. ............... 2/443 |

(Continued)

FOREIGN PATENT DOCUMENTS

| | | |
|---|---|---|
| CN | 101840075 | 9/2010 |
| DE | 10057102 | 5/2002 |

(Continued)

*Primary Examiner* — Audrey Y Chang

(57) ABSTRACT

3D glasses including features for an enhanced viewing experience with lower production and operating costs for theaters. Keyed lenses and removable temples facilitate assembly and field repairs. Specific angles of lens placement and the provision of specific anti-reflective areas on the frames enhance the quality of the optical path content being viewed. RFID and radio chips increase accountability and collection of use statistics. Smooth areas enhance cleaning and lower the time and material costs for between use cleanings.

21 Claims, 14 Drawing Sheets

(56) References Cited

U.S. PATENT DOCUMENTS

| | | | |
|---|---|---|---|
| 4,921,341 A * | 5/1990 | Ace | 351/86 |
| 5,218,386 A | 6/1993 | Levien | |
| 5,243,460 A * | 9/1993 | Kornberg | 359/464 |
| 5,638,145 A * | 6/1997 | Jannard | G02C 11/08 2/435 |
| 5,650,815 A * | 7/1997 | Dasso | 348/42 |
| 6,142,624 A | 11/2000 | Morris | |
| 6,736,504 B1 | 5/2004 | Hermsen | |
| 6,789,271 B2 * | 9/2004 | Banks | 2/426 |
| 7,255,437 B2 * | 8/2007 | Howell et al. | 351/41 |
| 7,380,936 B2 * | 6/2008 | Howell et al. | 351/158 |
| D603,445 S | 11/2009 | Carlow | |
| 7,784,938 B2 | 8/2010 | Richards | |
| D626,167 S | 10/2010 | Liu | |
| 7,959,295 B2 | 6/2011 | Richards | |
| 2006/0244897 A1 * | 11/2006 | Guenther | 351/43 |
| 2007/0236809 A1 | 10/2007 | Lippey | |
| 2008/0284982 A1 * | 11/2008 | Richards et al. | 352/38 |
| 2009/0296044 A1 | 12/2009 | Howell | |
| 2010/0060857 A1 | 3/2010 | Richards | |
| 2011/0032476 A1 | 2/2011 | Brown | |
| 2011/0187986 A1 | 8/2011 | Liu | |

FOREIGN PATENT DOCUMENTS

| | | |
|---|---|---|
| EP | 2302441 | 3/2011 |
| JP | 02005107396 A * | 4/2005 |
| WO | 2007110681 | 10/2007 |
| WO | 2007133482 | 11/2007 |
| WO | 2009026888 | 3/2009 |
| WO | 2011/115917 | 9/2011 |

* cited by examiner

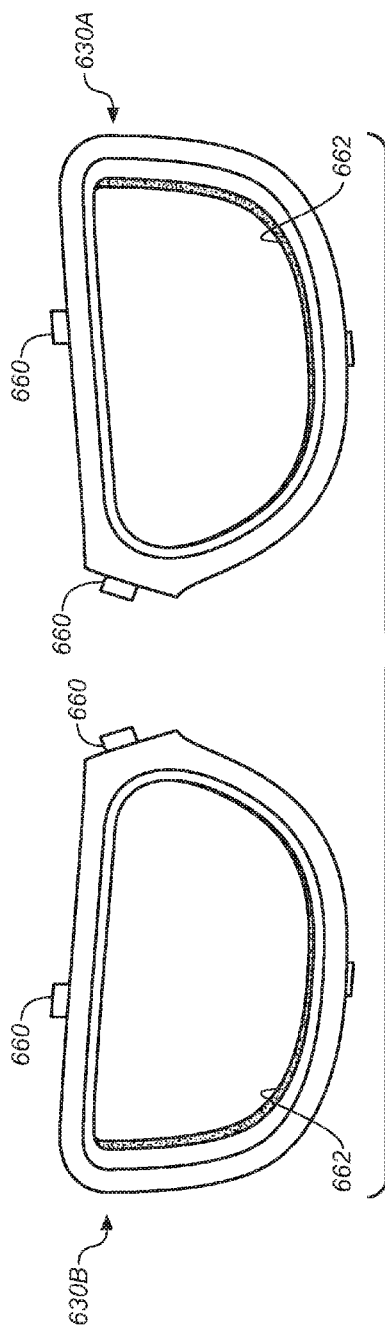
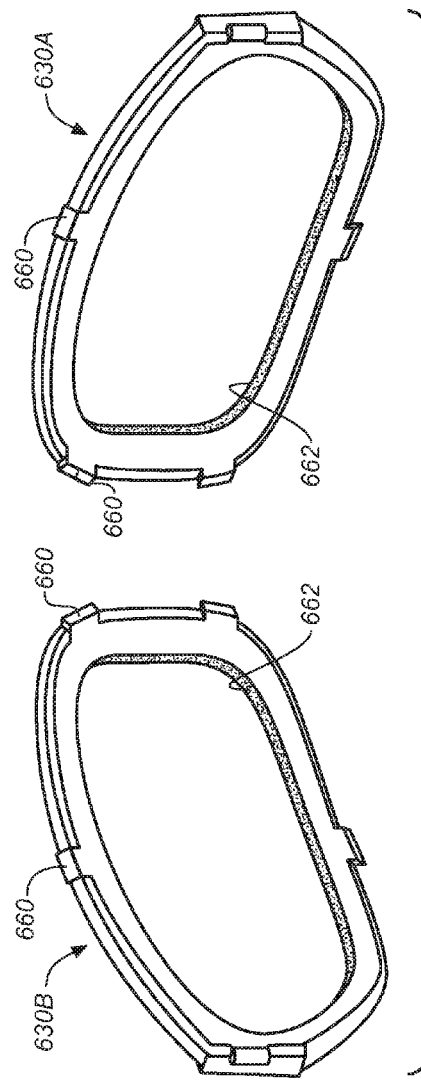

EYEGLASSES FOR PERSONAL AND COMMERCIAL USE INCLUDING REUSE IN 3D THEATER AND OTHER REPEATED OPERATIONS

CROSS REFERENCE TO RELATED APPLICATIONS

This Application claims the benefit of priority to related, Provisional U.S. Patent Application No. 61/449,635 filed on 5 Mar. 2011 entitled "Eyeglasses for Personal and Commercial Use Including Reuse in 3D Theater And Other Repeated Operations" by Andrew Healy, et al. hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Field of Invention

The present invention relates to eyewear and more particularly to 3D eyewear and 3D eyewear designated for repeated use in cinema theater operations.

Discussion of Background

Eyewear for use in 3D theater and other operations are known. For example, Richards et al, U.S. Pat. No. 7,784,938 describes eyewear for 3D theater operations. Other types of eyewear for 3D theater operations are also known, including disposable and recyclable glasses that are less environmentally friendly than glasses designated for washing and re-use.

Methods for 3D stereoscopic projection include Anaglyph, Linear Polarization, Circular Polarization, Shutter Glasses, and Spectral Separation. Anaglyph is the oldest technology, and provides left/right eye separation by filtering the light through a two color filter, commonly red for one eye, and cyan for the other eye. At the projector, the left eye image is (commonly) filtered through a red filter, and the right image filtered through a cyan filter. The eyewear consists of a red filter for the left eye, and a cyan filter for the right eye. This method works best for black and white original images, and is not well suited for color images.

Linear Polarization 3D provides separation at the projector by filtering the left eye through a linear polarizer (commonly) oriented vertically, and filtering the right eye image through a linear polarizer oriented horizontally. The eyewear consists of a vertically oriented linear polarizer for the left eye and a horizontally oriented polarizer for the right eye. The projection screen must be of the polarization preserving type, commonly referred to as a "silver screen" because of its distinctive color. Linear Polarization allows a full color image to be displayed with little color distortion. It has several problems, these include the need for a silver screen which is expensive, fragile, and not uniform. Another problem is that the viewer must keep his head oriented vertically to avoid crosstalk from one eye to another.

Circular Polarization 3D was invented to address the problem of requiring the viewer to keep his head oriented vertically. Circular Polarization provides separation at the projector by filtering the left eye image through a (commonly) left handed circular polarizer, and filtering the right eye image through a right handed circular polarizer. The eyewear consists of a left handed circular polarizer for the left eye and a right handed circular polarizer for the right eye. A silver screen is also needed for this approach.

Shutter Glasses provides separation by multiplexing the left and right images in time. A filter for separation at the projector is not required. The eyewear consists of Shutter Glasses. These are active glasses that electronically shutter the lens in synchrony with the projector frame rate. The left eye image is first displayed, followed by the right eye image etc. Since having a direct wired connection to the Glasses in a theatre is impractical, a wireless or infrared signaling method is used to provide a timing reference for the left/right eye shuttering. This method requires an IR or RF transmitter in the auditorium. The Shutter Glasses are expensive and hard to clean, require batteries that must be frequently replaced, and are limited in their switching rate. Shutter glasses are only practical for use with D-Cinema or other electronic projection systems since very few film projectors provide the signal required to synchronize the shutter glasses with the frame rate. The method does not require a silver screen.

Spectral Separation provides separation at the projector by filtering the left and right eye spectrally. The system differs from anaglyph in that the filters for the left and right eye each pass a portion of the red, green, and blue spectrum, providing for a full color image. The band pass spectrum of the left eye filter is complementary to the band pass spectrum of the right eye filter. The eyewear consists of filters with the same general spectral characteristics as are used in the projector. While this method provides a full color image, it requires color compensation to make the colors in the left and right eye match the colors that were present in the original image, and there may be a small reduction in the color gamut compared to the gamut of the projector.

All of the above methods for providing left/right eye separation for a 3D Stereoscopic presentation can be used with either two projectors (one for the left eye and one for the right eye), or may be used with a single D-Cinema projector system. In the dual projection system, the projection filter is usually static, and may be located in front of the projection lens or inside the projector. In a single D-Cinema projector system, the left and right images are time multiplexed. Except for the Shutter Glasses case where no projection filters are required, this means that the projection filters must change at the L/R multiplex frequency. This can be done with either a filter wheel in the projector synchronized to the multiplex frequency, or with an electronically switched filter.

SUMMARY OF THE INVENTION

The present inventors have realized the need for improvements in eyewear and particularly for improvements in eyewear that is re-used and even more particularly for eyewear in 3D cinema theater operations.

The present invention includes the provision of textured and smooth areas on glasses that reduce reflections and enhance cleanability or washing of the glasses for re-use. The present invention includes specifying shapes, sizes and structure of eyewear to enhance fitting of the general public (including adults and children), and to enhance fitting over prescription glasses.

The present invention includes a structure that improves viewing performance (including enhanced angular view through lenses of the glasses) and ease of assembly and repair of the glasses. These and other features of the invention may be practiced alone or, preferably, in combination with other features presented herein.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 12 is a drawing illustrating lens retaining mechanisms and [textured] areas according to an embodiment of the present invention;

DESCRIPTION OF THE PREFERRED EMBODIMENTS

Figure 1:
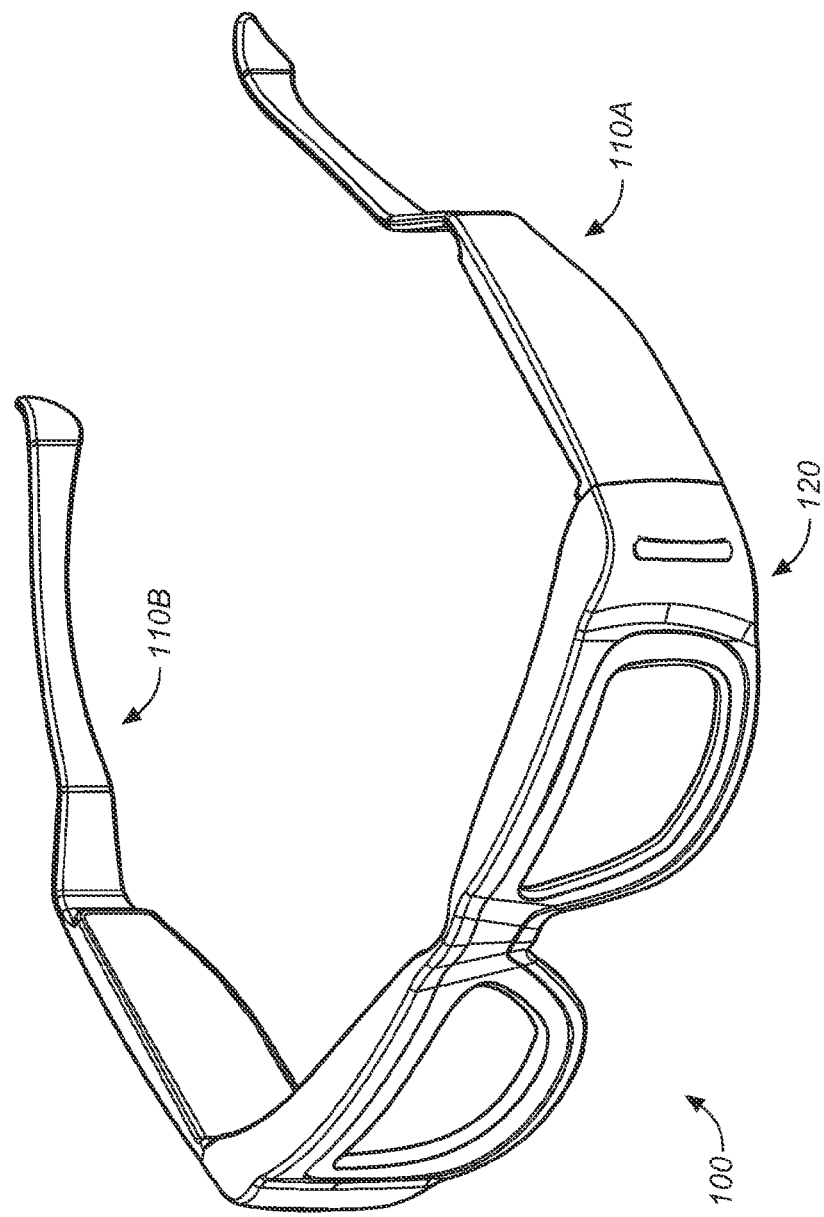
FIG. 1 is a drawing of 3D viewing glasses according to an embodiment of the present invention.
Figure 2:
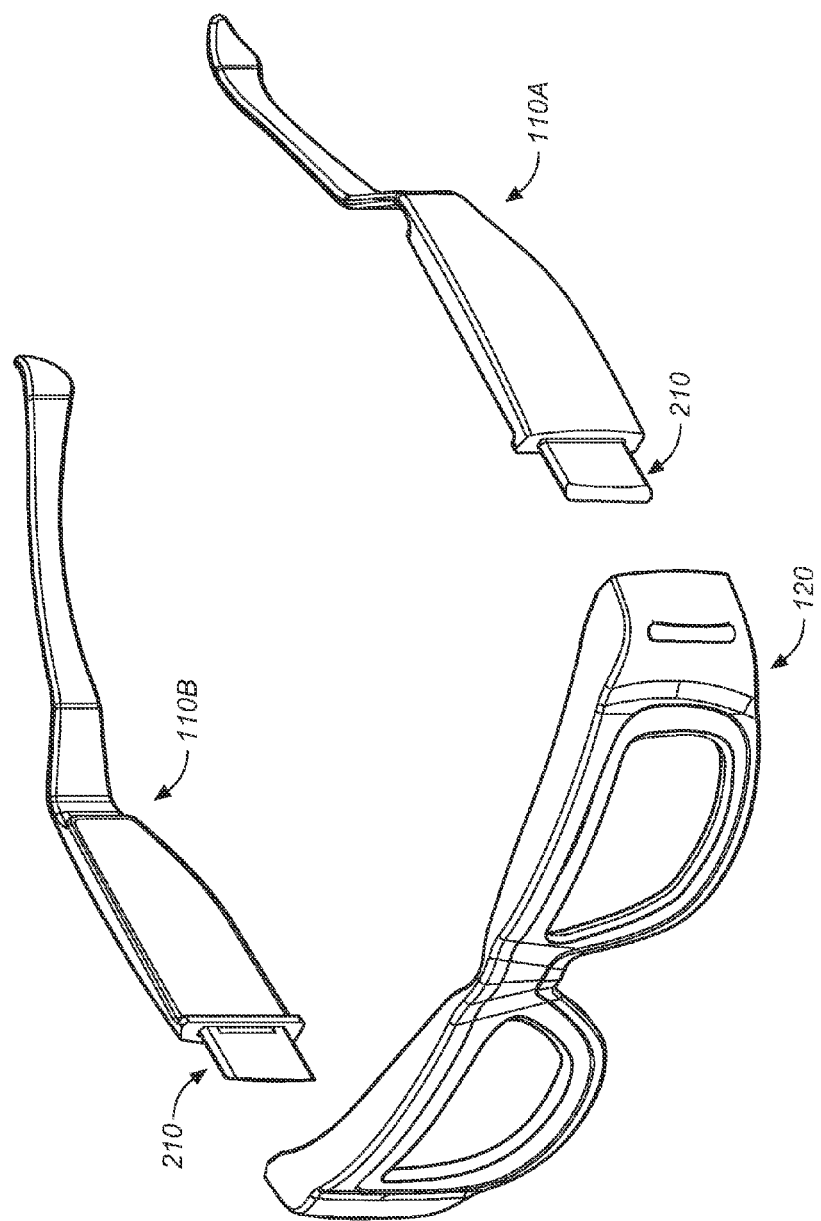
FIG. 2 is a drawing illustrating removable temples according to an embodiment of the present invention.

Referring now to the drawings, wherein like reference numerals designate identical or corresponding parts, and more particularly to FIG. 1 thereof, there is illustrated 3D viewing glasses 100 according to an embodiment of the present invention. The glasses 100 include removable temples 110 (e.g., right temple 110A and left temple 110B) that are illustrated in the removed position in FIG. 2.

The removable temples 110 include, for example, an attachment mechanism. An attachment mechanism 210 is shown which comprises an insert tab that fits into a receptacle (not shown) of the lens frame 120. Preferably, the attachment mechanism securely fits into the receptacle and is not easily or casually removed by a user, but do remove prior to breakage when force is applied in a remove the temple motion (e.g., pulling the temple back from the lens frames 120 in this example). The removable temples allow for repair and by maintaining a fixed position help provide security from accidental (or intentional) folding and placement in a user's pocket when exiting a theater (since this embodiment does not fold). Other embodiment may include a similar attachment/detachment mechanism and include a hinge or other temple folding method (e.g., glasses intended for purchase by a user).

Figure 3:
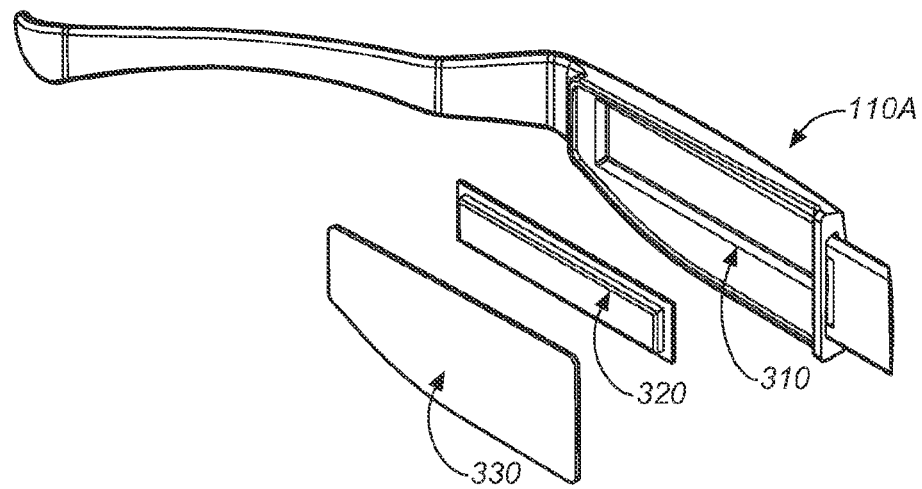
FIG. 3 is a drawing of an [RFID] temple according to an embodiment of the present invention.

FIG. 3 is a drawing of a temple (left temple 110A in this example) with a sensor tag (e.g., radio microchip, sensormatic tag, etc.) according to an embodiment of the present invention. The sensor tag may be utilized, for example, for accounting and other management aspects of the glasses. Example management and other aspects may be found in, for example, Hovanky et. al., PCT Patent Application Publication No. 2011/115917 (titled "3D Glasses and Related Systems", the content is incorporated herein by reference in its entirety. The sensor tag may be, for example, an embedded Sensormatic security tag 330. Cavity 310, cover 330 and adhesive (not shown) are selected to ensure a water tight seal and prevent damage during washing.

Figure 4:
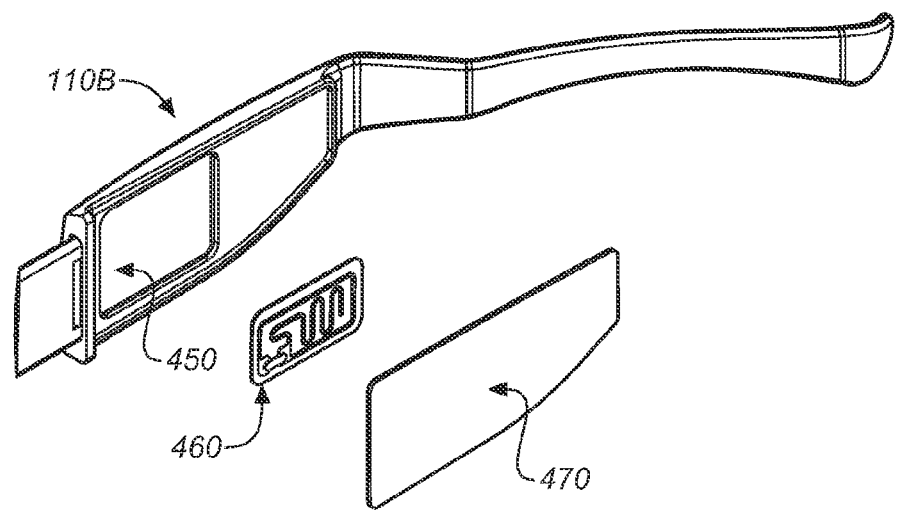
FIG. 4 is a drawing of a [radio microchip] temple according to an embodiment of the present invention.

FIG. 4 is a drawing of a temple (right temple 110B in this example) with an RFID tag 460 according to an embodiment of the present invention. The RFID tag may be utilized for counting uses of glasses according to the present invention. Preferably, glasses according to the present invention include both RFID and sensormatic type tags to enable the advantages of both types of devices in a management system unique to theater operations and re-use (either by owner reuse, theater operator re-use, or contractor/theater operator re-use scenarios—e.g., see Healy et al. referenced further above). As shown in FIG. 4, Cavity 450, cover 470 and adhesive (not shown) are selected to ensure a water tight seal and prevent damage during washing.

Figure 5:
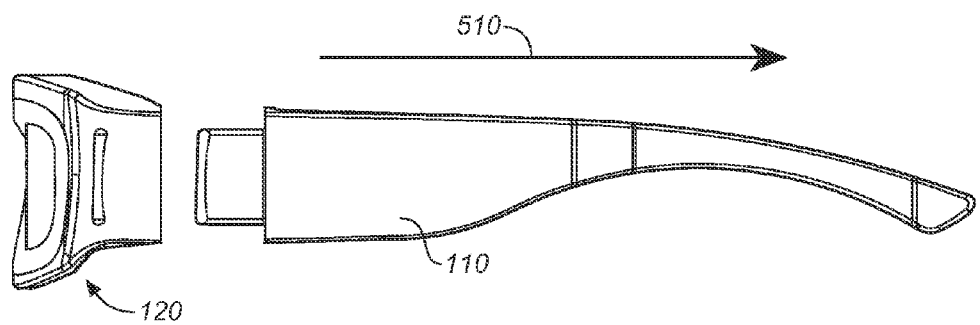
FIG. 5 is a side view drawing of a removable temple according to an embodiment of the present invention.

FIG. 5 is a side view drawing of a removable temple 110 according to an embodiment of the present invention. The directional arrow 510 illustrates the application of force to remove the temple from the lens frame 120.

Figure 6:
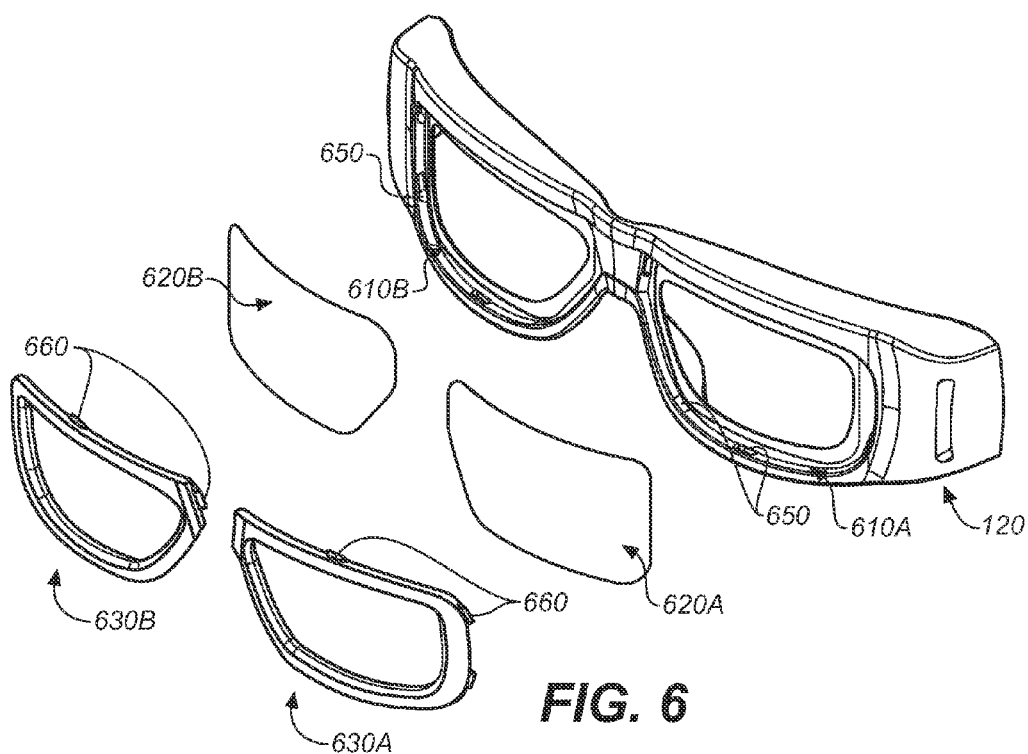
FIG. 6 is a drawing of a lens retention mechanism according to an embodiment of the present invention.

FIG. 6 is a drawing of a lens retention mechanism according to an embodiment of the present invention. The lens retention mechanism includes a lens securing area 610 (e.g., left eye lens securing area 610A, and right eye lens securing area 610B), and snap rings 630. Lenses 620 are fit into the lens securing area and held in place by the snap rings 630. The snap ring is shown as a full ring that fits around the entire lens securing area, however, other embodiments may use another type of fitting or device to hold the ring in place (e.g., a partial snap ring, securing screws, adhesive, etc.).

The snap ring may be provided as shown (snapping in from the front of the glasses), or snap in from the rear. The illustrated embodiment is a snap in from the front embodiment (The lenses are assembled into the glasses frame from the front of the frame). Structurally, the finished product has the advantage of bringing the lens closer to the user's eyes. With the lenses closer to the user's eyes, a greater field of view is obtained, and reduces reflection (e.g., the user's own reflection) from/on the inside of the lenses. In one embodiment, a field of view is maintained (compared to a rear loaded snap ring) with a smaller lens size.

The present invention includes the use of key spaces 650 located at various locations in the lens securing areas 610. Key spaces for the left eye lens and right eye lens securing areas are different. Corresponding keys on the lenses (not shown) and the snap rings (e.g., snap ring keys 660) assure that left eye lenses and right eye lenses are placed in the proper corresponding lens securing area. In other embodiments, the keys are located on the glasses frames and key spaces on the lenses (or snap rings).

The lens keys facilitate manufacturing and also provide for easier and more certain field repair. This is particularly important when the 3D projection system for which the glasses are being utilized requires specific filters or other properties in the left or right lenses. Thus, the present invention includes manufacturing keyed 3D lenses (and/or snap rings), assembling 3D glasses with keyed lenses, and the collection, washing, repair, and distribution of 3D glasses with keyed lenses.

Figure 7:
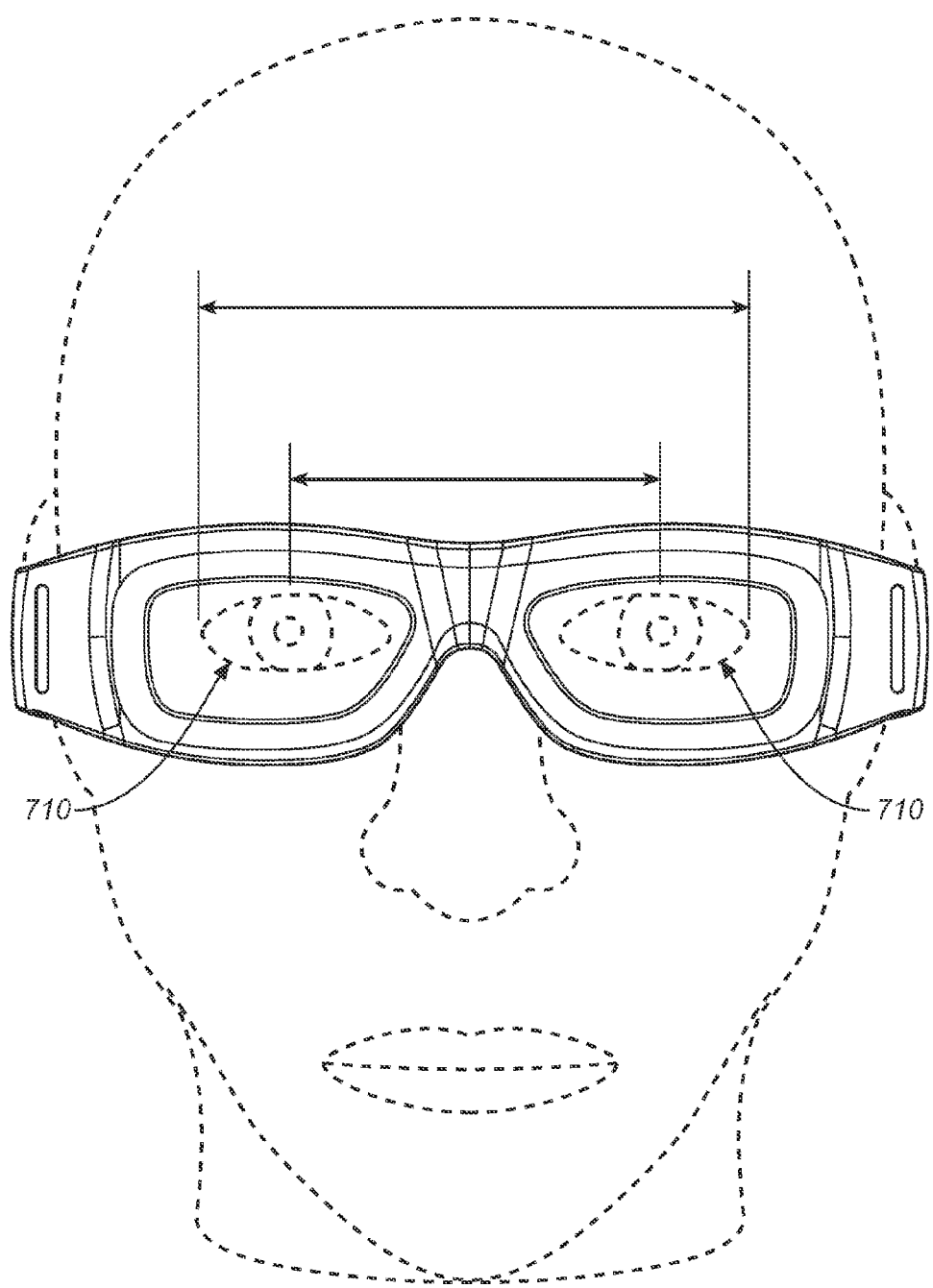
FIG. 7 is a drawing illustrating inter pupil distance that is optimized in embodiments of the invention.

FIG. 7 is a drawing illustrating inter pupil distances that are optimized in embodiments of the invention. The present invention includes one pair of glasses that adapted to fit and operate successfully on either child or adult head sizes. However, the invention also includes glasses prepared specifically for average children head sizes, and which carry a reduced weight. The inter pupil distances noted in FIG. 7 are maintained in the "adult" sized glasses of FIG. 1 for both average adult inter pupil distances and average child inter pupil distances. This is further described in Richards et al patent application Ser. Nos. 11/804,602 and 12/530,379, the contents of each of which are incorporated herein by reference in their entirety.

In addition, the present invention includes the use of spherically shaped lenses which can enhance the range of the lens' sweet spots (optimized viewing area) 710. Such an optimized viewing area can be used to account for differences in variable IPD (inter-pupil distances) such as those encountered between children and adults. Accordingly, the optimized sweet spot may be used to make a single sized pair of glasses that is effective for both adult and child viewers, or may be used to increase the sweet spot on either adult specific or child specific glasses. The optimized sweet spot of the cylindrical glasses on layered plastic type lenses (e.g., spectrally separated lens filters) may have, for example, an aperture of 1066.2 mm$^2$ and a Ratio (useable area/clear aperture area) of 0.564.

Figure 8A:
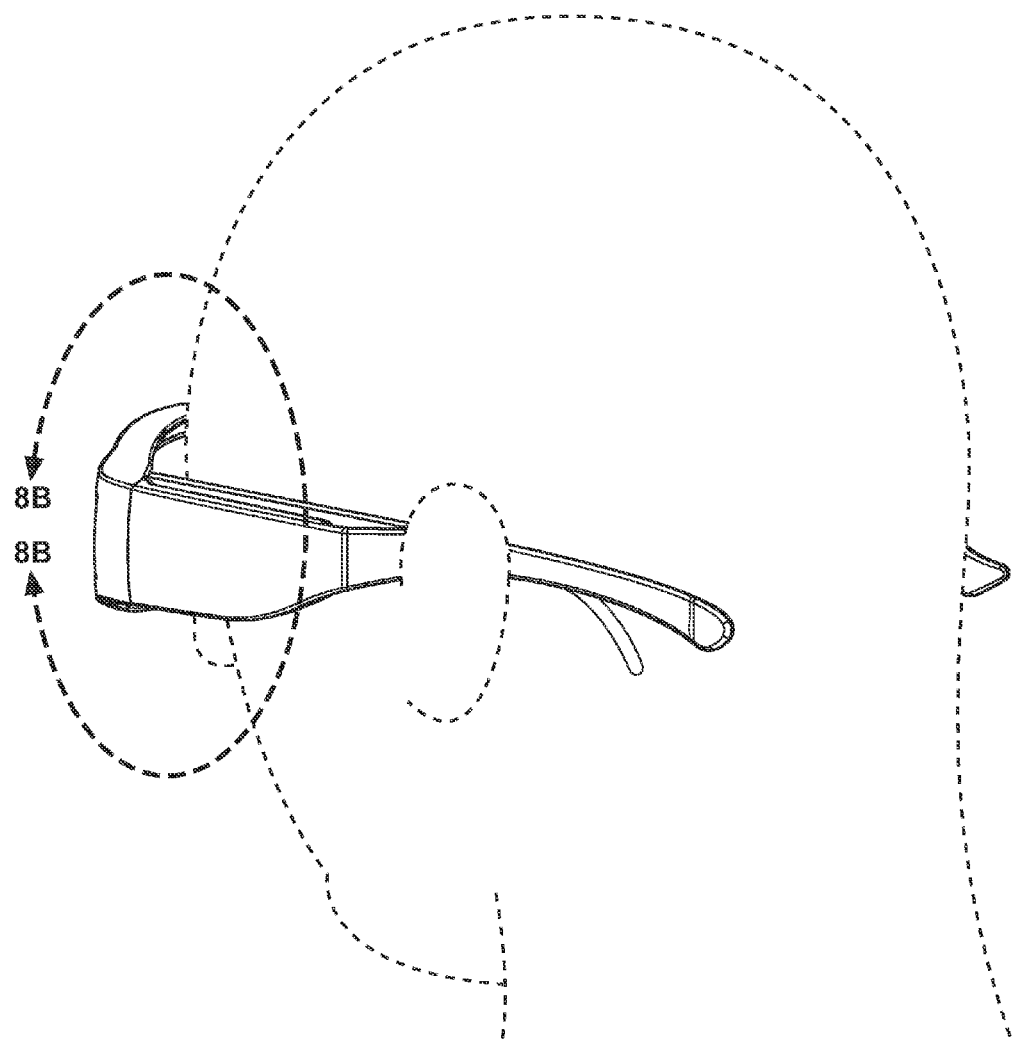
FIG. 8 is a drawing illustrating a shelf according to an embodiment of the present invention.
Figure 8B:
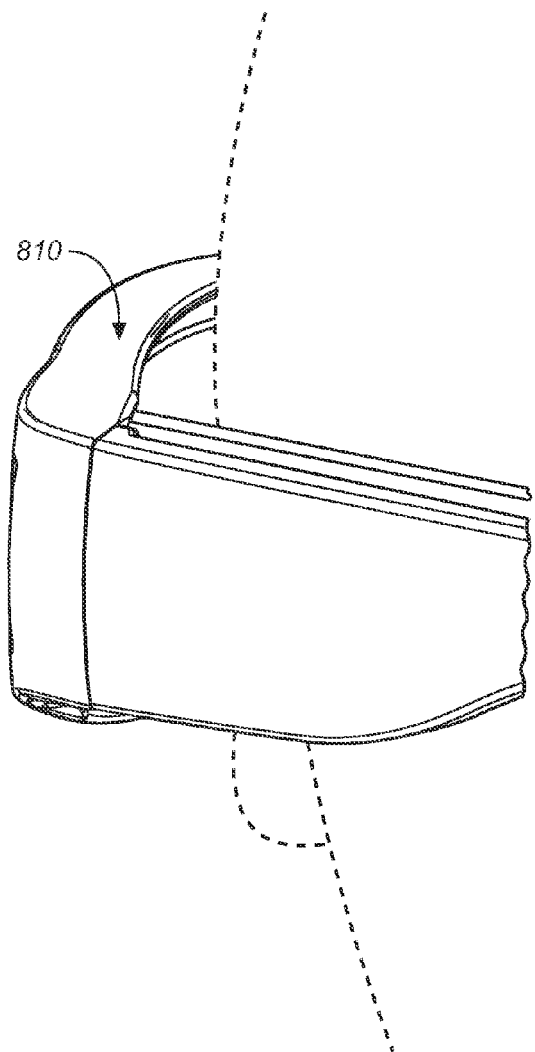
Figure 8C:
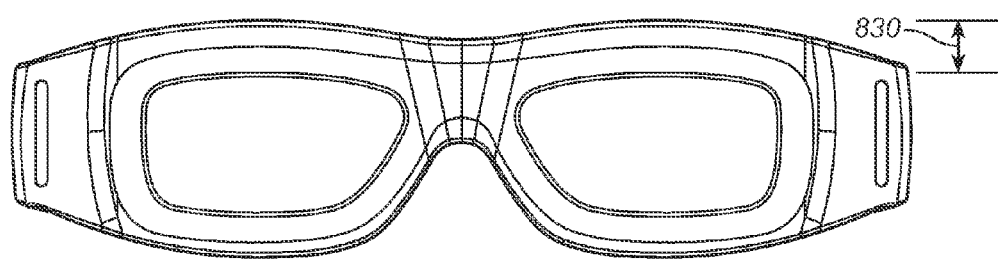

FIG. 8 is a drawing illustrating a shelf (or lid) 810 according to an embodiment of the present invention. The shelf 810 comprises, for example, a lens frame attached device that enables optical alignment of prescription glasses to the viewing areas of the lenses of the 3D glasses. This feature allows the glasses to rest on top of prescription eyewear, bringing the lens sweet spot into optimal position for content viewing. Overall, the dimensions of the glasses support and is designed to fit over 98% of prescription eyewear, with the inner frame designed to 146 mm.

Visual performance of the glasses is a complex relationship between design features including angle (tilt) of the lenses, height of the bridge of the nose, temple position resting on the user's ears and the resultant angle created to the front (frame) of the glasses, for prescription eyewear users, the height of the shelf above the lenses [(e.g., 9.1 mm as shown by 830)], and inter-temple dimension for fit over prescription eyewear. The sweet spot or optimized area is particularly important with the use of spectrally separated lens filters for 3D viewing. The spectrally separated lens filters may be of different varieties (e.g., filters that spectrally separate and specifically adapted to pass light bands blocked by a projection or display mechanism of the same channel—e.g., any of the configurations described in Richards et al. above (DOL216/217); or, for example, spectrally separated filters configured to pass narrowband lights in pass areas (high pass, low pass, or band passes) that include a shifting pass area specifically configured to pass the narrow band light when viewed off-axis—e.g., any of the embodiments described in Richards, U.S. patent application Ser. No. 61/452,638).

In one embodiment, the shelf may be used in conjunction with blocks, holders, or other mechanisms that help maintain the alignment such as pantoscopic tilt and placement of the optimized viewing areas of the glasses (e.g., 3D glasses) in proper alignment with lenses of the prescription glasses.

Figure 9:
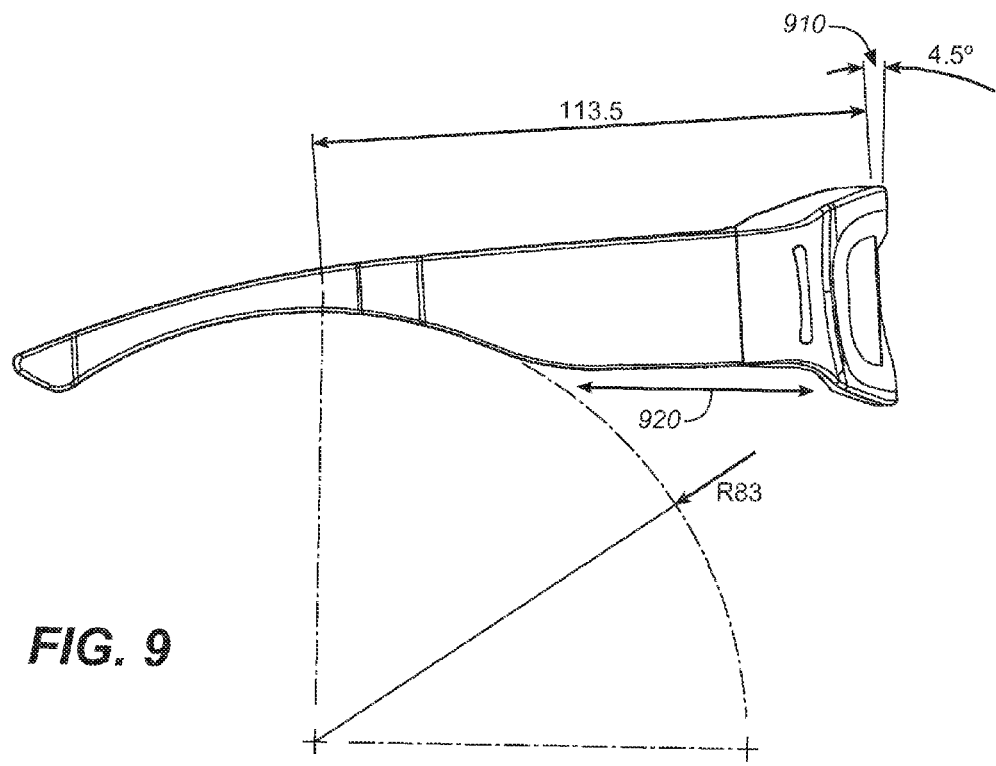
FIG. 9 is a drawing illustrating a pantoscopic tilt according to an embodiment of the present invention.
Figure 10:
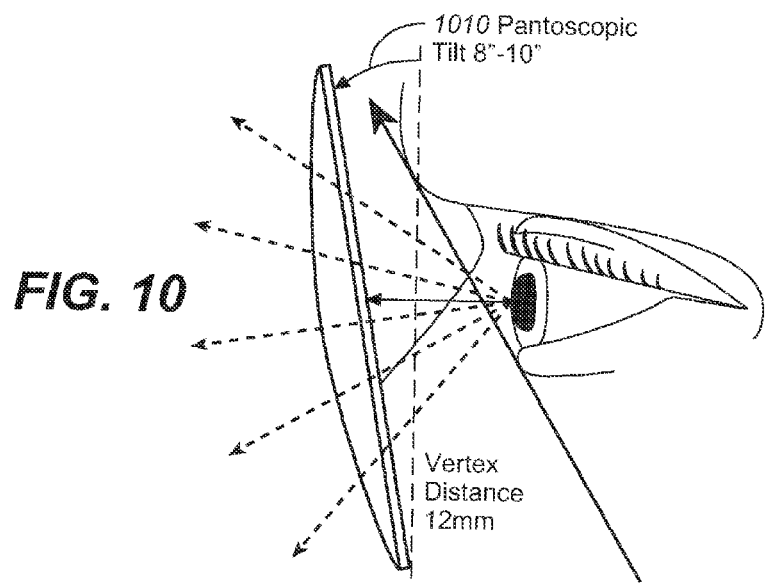
FIG. 10 is a drawing illustrating pantoscopic tilt for typical eyewear.

FIG. 9 is a drawing illustrating a pantoscopic tilt 910 according to an embodiment of the present invention. In this example the pantoscopic tilt is approximately 4.5 degrees. Note that the preferred pantoscopic tilt for 3D cinema is opposite to that of typical eyewear as shown by FIG. 10 which is a drawing illustrating pantoscopic tilt of typical eyewear. The "reversed" pantoscopic tilt according to the invention is utilized to bring the 3D lens sweet spot to an optimal viewing position on the lens.

The tilt remains the same for child and adult sized glasses. The distance 920 between the front of the glasses and the beginning of the arc has been adjusted [(smaller)] to suit children's heads.

Figure 11:
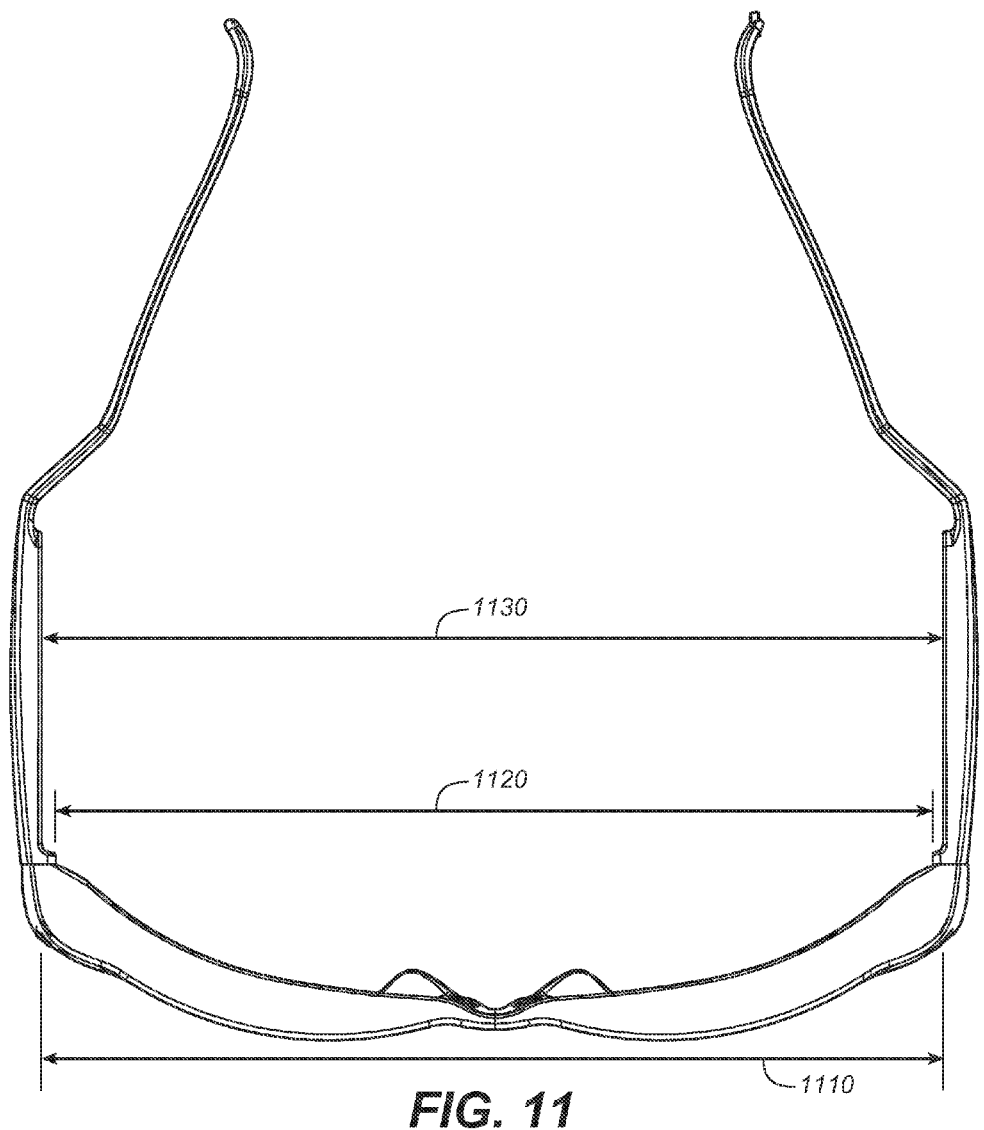
FIG. 11 is a drawing illustrating dimensions according to embodiments of the present invention.

FIG. 11 is a drawing illustrating dimensions according to embodiments of the present invention. Taking into account flexibility of the frame (e.g., dihedral flex) and average child head sizes, the dimensions illustrated have been thoroughly reviewed, tested (including focus group study and actual field tests) and then modified for optimal performance for use by children. The noted dimensions are 1110 being 146 mm, 1120 being 147 mm, and 1130 being 149.4 mm. Approximately as variations can be made and still result in acceptable (even if sub-optimal) performance on average.

FIG. 12 is a drawing illustrating lens retaining mechanisms (snap rings) and [textured] areas according to an embodiment of the present invention. The illustrated snap rings include keys 660 and the textured areas are designed to minimize unwanted reflections from edges of the snap rings that would otherwise degrade the quality of a 3D cinema experience. Texturing 662 on this area of the snap ring (or on similar areas of other glasses of any design) address the unwanted reflection issue which only becomes apparent with use of glasses in a cinema environment (or other environments using glasses in dark areas with some sort of bright lighting or display being viewed), that is reflection from edges of a lens retention device (or perhaps even edges of lenses depending on the design of the glasses) through the lens and into the viewing path. Texturing is utilized in the present invention, but other mechanisms may be utilized (e.g., absorptive materials, non-reflective surfaces, etc.).

FIGS. 13, 14, 15, and 16 are drawings illustrating [smooth] areas on glasses according to embodiments of the present invention. The smooth areas are in contrast to the non-reflective areas previously discussed. Most notably, the smooth areas function to help keep the glasses clean. Since the glasses come in contact with users from the general public (and privately owned models are used by their owners), they must be cleaned. Here, the areas of typical contact with the general public are smooth, which enhances cleaning of the areas that will likely pick up the largest amount of contaminants. The smooth areas may also reduce the amount of detergent and wash time necessary to effectively clean the glasses after every use.

Figure 13A:
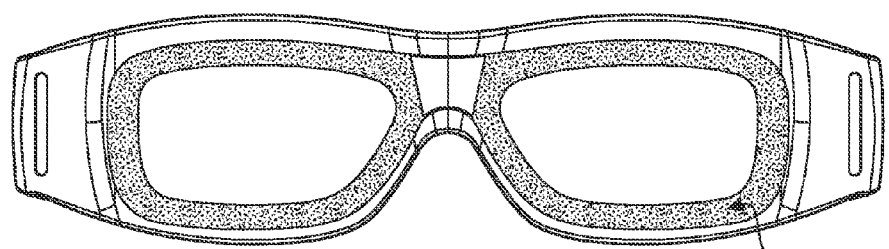
FIG. 13 is a drawing illustrating [smooth] areas on glasses according to embodiments of the present invention.
Figure 13B:
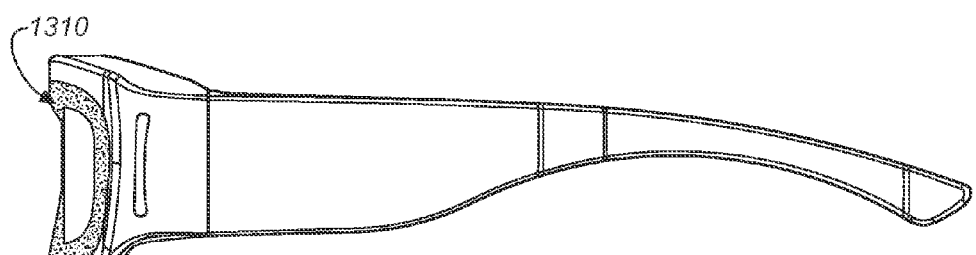
Figure 13C:
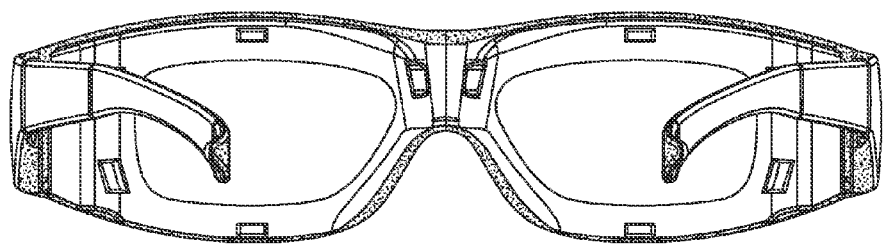
Figure 14A:
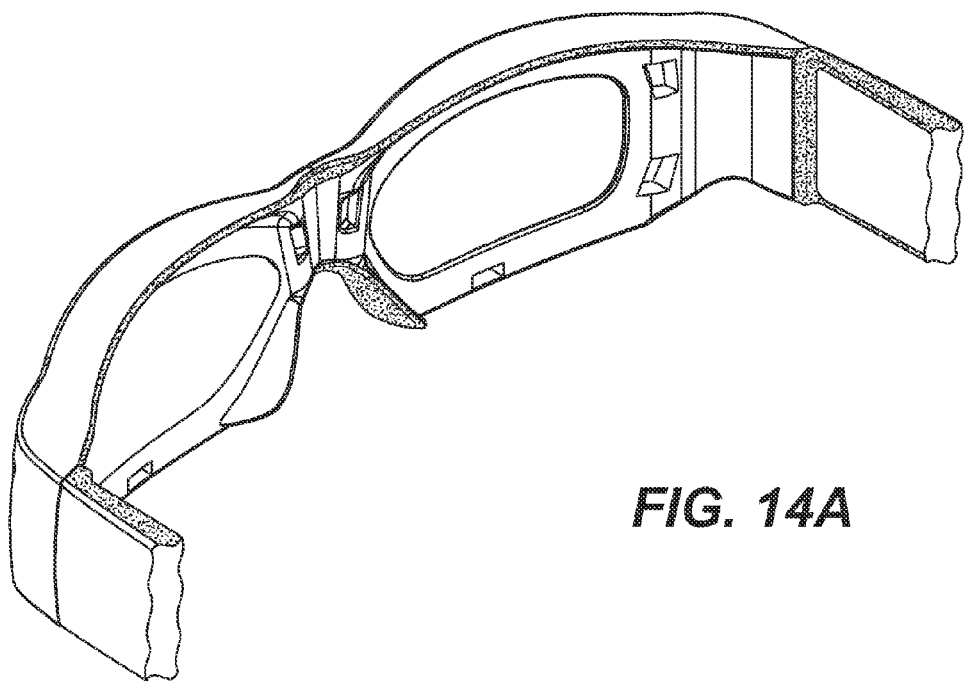
FIG. 14 is a drawing illustrating [smooth] areas on glasses according to embodiments of the present invention.
Figure 14B:
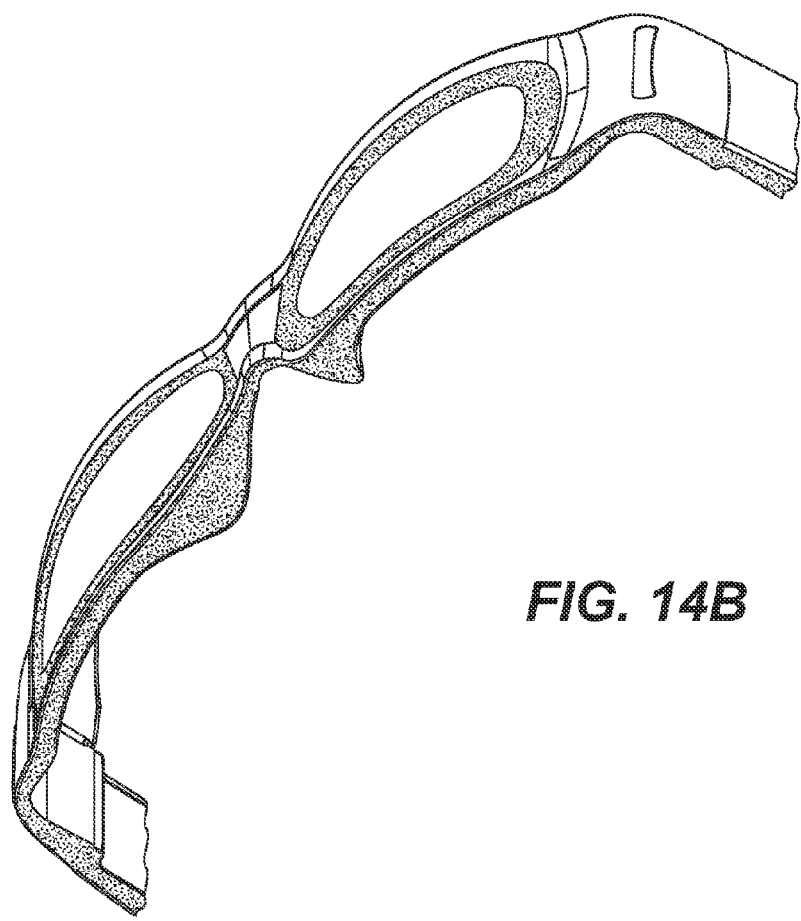
Figure 15A:
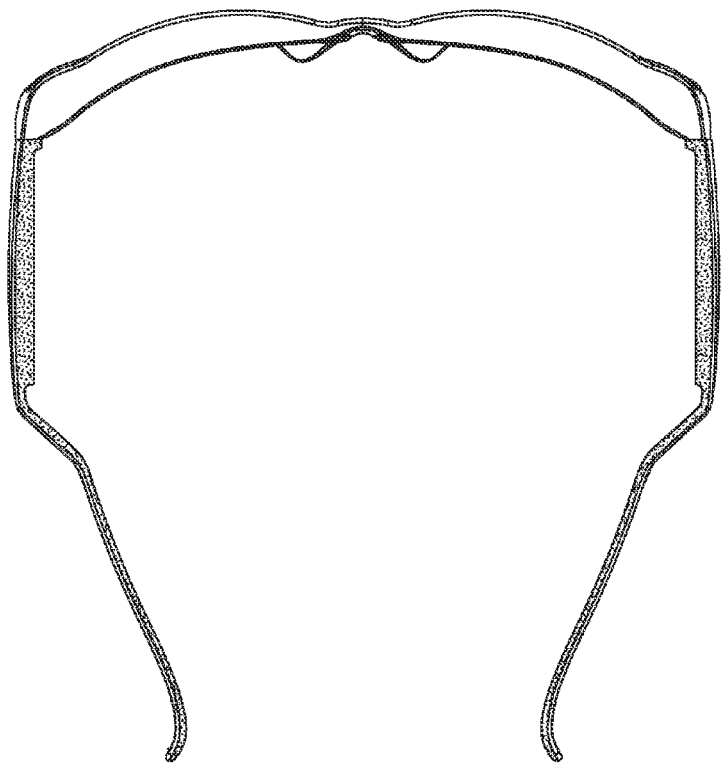
FIG. 15 is a drawing illustrating [smooth] areas on glasses according to embodiments of the present invention.
Figure 15B:
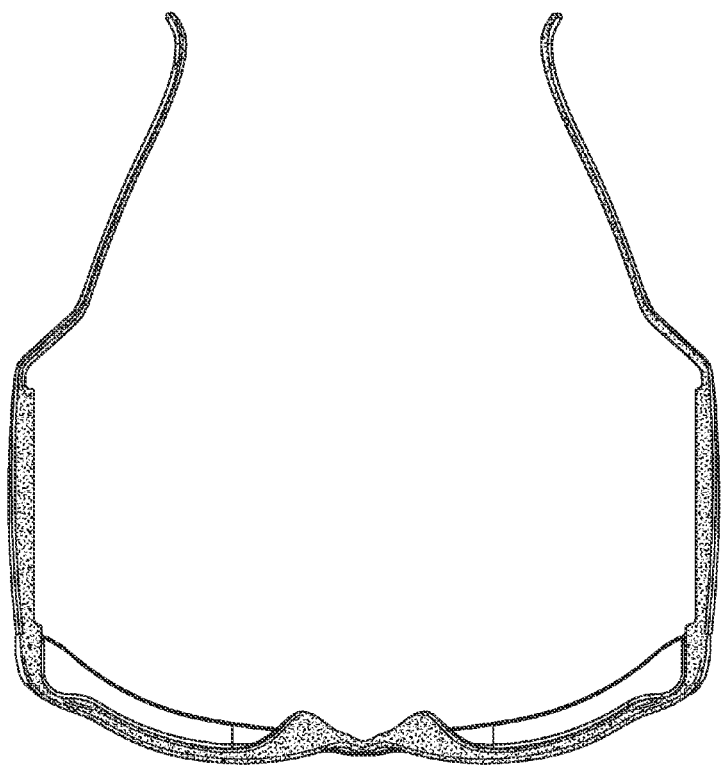
Figure 16A:
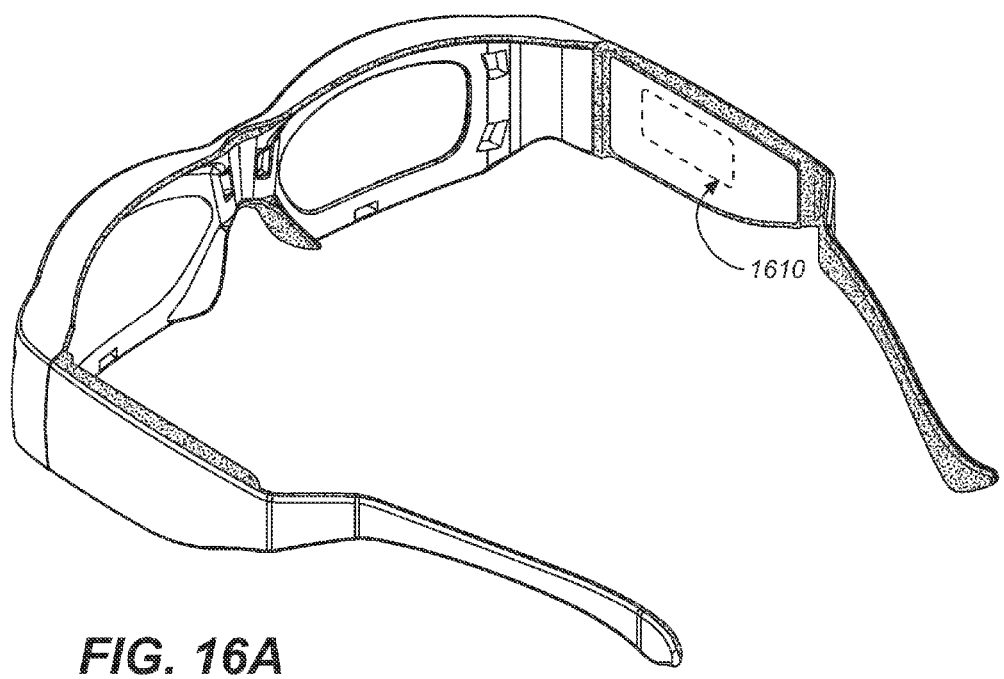
FIG. 16 is a drawing illustrating smooth areas on glasses according to embodiments of the present invention.
Figure 16B:
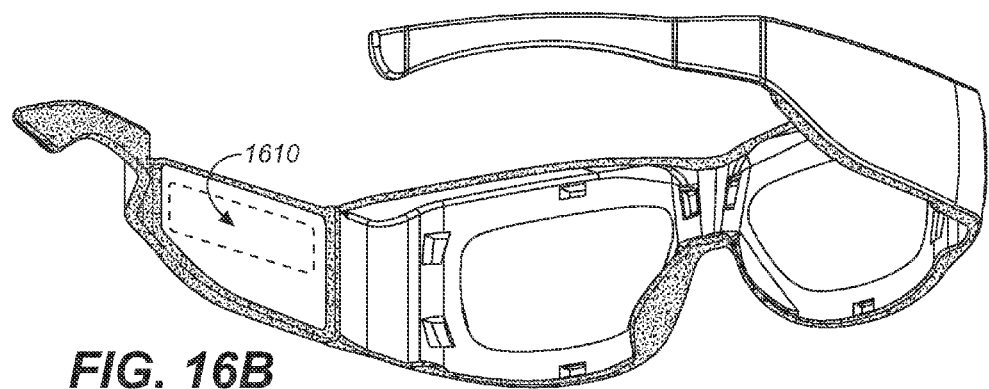

In FIG. 13, [smooth] areas 1310 comprise, for example, polished external surfaces of the snap rings—as mounted on the frame—which are aesthetic appealing and easy to clean. In FIG. 16, smooth areas 1620 comprise, for example, Polished surfaces of the temples improve bonding strength and sealing integrity of the pressure-sensitive adhesive used to adhere the cover labels to the body of the temples.

Although the present invention has been described herein with reference to 3D glasses, many of the same techniques and structures may be useful in traditional glasses (prescription, sunglasses, protective glasses, etc.). In describing the preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. Furthermore, the inventors recognize that newly developed technologies not now known may also be substituted for the described parts and still not depart from the scope of the present invention. All other described items, including, but not limited to lens angles, smooth areas, keys or keyed lenses and retention mechanisms, child and adult sizing and structures, RFIDs and radio chips etc. should also be considered in light of any and all available equivalents.

Portions of the present invention may be conveniently implemented using a conventional general purpose or a specialized digital computer or microprocessor programmed according to the teachings of the present disclosure, as will be apparent to those skilled in the computer art. For example, identifying glasses or users by RFID or radio communication with chips embedded in the glasses, and any accounting, billing, data mining or other activities assisted by computer of further communications with the embedded chips or sending the data over communication lines or networks to storage or other programs.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, HD-DVD, Blue-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

The present invention may suitably comprise, consist of, or consist essentially of, any of element (the various parts or features of the invention and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. Glasses for 3D viewing comprising:
a frame for 3-D lenses, the frame configured to hold 3-D lenses for 3-D viewing, the 3-D lenses further comprising a 3-D right lens and a 3-D left lens, and the frame further comprising snap rings, the snap rings configured to hold the 3-D lenses in place when the snap rings are mechanically mated to the frame;
at least one removable temple, the at least one removable temple removably attached to the frame for 3-D lenses, wherein the at least one removable temple further comprising a cavity, the cavity configured to house a sensor;
a cover, the cover configured to attach to the at least one removable temple;
wherein the cover provides a seal for the cavity; and
further wherein the snap rings further comprise textured areas, and the textured areas being substantially non-reflective.

2. The glasses for 3D viewing according to claim 1, wherein at least one of the removable temples comprise a pin configured to be inserted into a receptacle on a frame of the viewing glasses.

3. The viewing device according to claim 1, wherein the glasses are part of a set of glasses that are re-used by different members of the public at a digital cinema, washed between use, and include smooth areas on portions of the glasses that generally contact a user during viewing use of the glasses.

4. A viewing device, comprising:
a frame for 3-D lenses;
a 3-D right lens and a 3-D left lens, the 3-D right lens and the 3-D left lens mechanically mated to the frame for 3-D lenses by a snap ring;
a set of temples, the set of temples mated to the frame for 3-D lenses;
wherein the snap ring further comprise textured areas, and the textured areas being substantially non-reflective.

5. The viewing device according to claim 4, wherein the device further comprising lenses and a retaining mechanism that is a same width or wider at a front side of the lenses compared to a back side of the lenses.

6. The viewing device according to claim 4, wherein device comprise a retaining mechanism comprising a snap ring at a front side of the lenses.

7. The viewing device according to claim 6, wherein the retaining mechanism brings at least one point of the lenses as close to the viewer's eyes as possible.

8. The viewing device according to claim 4, wherein the 3-D right lens and the 3-D left lens further comprising spectrally separated filter lenses and a shelf at a top of a frame holding the spectrally separated filter lenses.

9. The viewing device according to claim 8, wherein the shelf is configured to rest on a separate pair of prescription glasses and optically align lenses of the prescription glasses to the spectrally separated filter lenses of the viewing device.

10. The viewing device according to claim 9, wherein the shelf is configured to rest on top of the separate pair of prescription glasses, bringing a sweet spot of the spectrally separated filter lenses into an optimal position for content viewing.

11. The viewing device according to claim 9, wherein dimensions of the device are designed to fit over a majority of separate pairs of prescription glasses.

12. The viewing device according to claim 11, wherein an inner frame portion of the device is 146 mm wide.

13. The viewing device according to claim 8, wherein the spectrally separated filter lenses are configured to spectrally separate wide-band lights.

14. The viewing device according to claim 4, wherein the right lens and the left lens further comprising spectrally separated filter lenses configured to spectrally separate narrow band lights.

15. The viewing device according to claim 4, further comprising at least one of Radio Frequency Identification (RFID) and sensormatic tags.

16. The viewing device according to claim 15, wherein at least one of the tags is utilized in an accountability program.

17. The viewing device according to claim 15, wherein at least one tag is embedded in the glasses.

18. The viewing device according to claim 15, wherein at least one of the tags is embedded in at least one temple of the glasses.

19. The viewing device according to claim 15, wherein the tags are embedded in opposing temples of the glasses.

20. The viewing device according to claim 15, wherein the glasses are adapted to fit average child size heads.

21. Glasses for 3D viewing comprising:
a frame for 3-D lenses, the frame configured to house a 3-D right eye lens and a 3-D left eye lens, wherein the frame comprises a set of right eye lens key spaces and a set of left eye lens key spaces in corresponding lens retaining areas of the frame;
wherein a snap ring for the 3-D right eye lens further comprises a set of right eye lens keys and a snap ring for the 3-D left eye lens further comprises a set of left eye keys, the right eye lens keys and left eye lens keys configured to mate into the set of right eye lens key spaces and the set of left eye key spaces respectively on the frame for 3-D lenses on the corresponding lens retaining areas of the frame; and
wherein the snap ring further comprise textured areas, and the textured areas being substantially non-reflective.

* * * * *